March 26, 1957     R. C. LINDLEY     2,786,272
DENTAL PLATENS FOR ORIENTATING AND HOLDING CASTINGS Filed June 8, 1953     3 Sheets-Sheet 1

INVENTOR.
Ross C. Lindley
BY

March 26, 1957   R. C. LINDLEY   2,786,272
DENTAL PLATENS FOR ORIENTATING AND HOLDING CASTINGS
Filed June 8, 1953   3 Sheets-Sheet 2

INVENTOR.
Ross C. Lindley
BY Barnes & Seed
attys.

March 26, 1957 R. C. LINDLEY 2,786,272
DENTAL PLATENS FOR ORIENTATING AND HOLDING CASTINGS
Filed June 8, 1953 3 Sheets-Sheet 3

INVENTOR.
Ross C. Lindley
BY Barnes & Seed
attys.

United States Patent Office 2,786,272
Patented Mar. 26, 1957

2,786,272

DENTAL PLATENS FOR ORIENTATING AND HOLDING CASTINGS

Ross C. Lindley, Seattle, Wash.

Application June 8, 1953, Serial No. 371,101

7 Claims. (Cl. 32—32)

This invention relates to the art of casting, and especially the casting of an object demanding painstaking attention to surface detail and in which a modeling material from which a forming matrix is to be produced is shaped upon a master pattern the surface configuration of which bears a necessary relationship to the surface detail which is to be worked into the model. Dentistry is a field to which the present invention peculiarly lends itself, particularly in the making of any repair or restoration piece such as a crown, inlay or the like.

Previous to the introduction of the present apparatus and technique illustrated in my co-pending applications, Ser. No. 227,418, filed May 21, 1951, now Patent No. 2,700,218 and Ser. No. 240,515, filed August 6, 1951, now Patent No. 2,700,219 where teeth are to be repaired or restored by fitting thereon a piece cast to a shape which will maintain proper bite relationship between opposing teeth, it has been the approved practice to make full upper and lower casts of the dental arches and upon these full casts shape a wax model of the repair or restoration piece which is to be made.

The advantage which is attained by the use of these full casts is that the presence of the patient is not required in order to determine contacts, occlusions, and marginal ridges. This is to say that the presence of the patient is required only to (1) prepare the cavity which is to receive the cast piece, (2) obtain impressions from which the full-arch casts are made, and (3) finally fit the cast piece in position. There has, however, been this objection to the use of full-arch casts, and that is the need for the dentist to handle a rather bulky object in making his study of the concerned tooth or teeth, readying the tooth for the shaping of the wax model of the repair or restoration piece which is to be made, and shaping this wax model upon the tooth.

Looking to the provision of a technique which would overcome this objection, I visualized that the answer was to separate from the full cast the particular tooth or teeth on which work was to be performed but I further perceived that in order for this to be done the tooth must be so constituted as to reassume the exact location which it originally occupied in the casting when such removable tooth is returned to the casting. This is self-evidently necessary in that disarrangement in even the minutest degree will change the relationship of the teeth from which the dentist interprets the bite.

The general object of the present invention is to provide an improved platen which will enable a cast of all or a part of a dental arch to be divided, freely separated, and the parts returned to position without in any way disturbing the relationship of parts which existed in the original casting. A further object is to provide an arrangement whereby the parts of the casting can be easily locked to the platen so that the latter can be turned upside down.

Other more particular objects and advantages will appear and be understood in the course of the following description and claims, the invention consisting in the new technique and in the advanced form of a platen used in practicing said technique.

Figure 1:
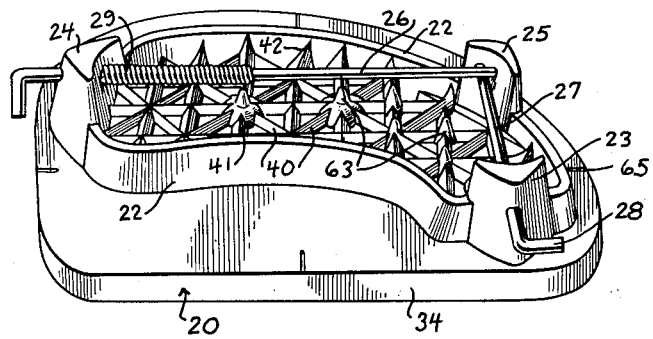
Figure 1 is a perspective view illustrating one form of my dental platen with sleeved locking pins particularly adapted for upper jaw patterns, the pin sleeves being shown fragmentarily.

The platen 20, best shown in Fig. 1, is intended particularly for the mounting of patterns of the upper-right portions of the jaw in that it is provided with removable locking pins for holding the pattern to the platen when the latter is upside down on an articulator 30. However, it is equally satisfactory for patterns of the lower-left part of the jaw and perforce a mirror complement thereof is suitable for the other two halves of the dental arches. Such a complement, denoted 21, is found in Figs. 9 and 10, and its intermediate anchoring post 25 can be excluded as unnecessary since the platen remains upright when mounted on the articulator.

The platens are produced from any suitable materials, a hard thermosetting plastic by preference, and present upon their upper surface a fretted bed lying within the confines of an upstanding wall 22 having its inner face moderately scarped so as to slope upwardly toward the crest. The figure outlined by the wall 22 is shown as having a generally arcuate shape corresponding to half of a dental arch narrowing to a blunt angle at the ends, and rising above the wall at each such end is a surmounting post, as 23 and 24.

The platen 20 for upper jaw patterns is provided with a third surmounting post 25 toward the fore part of the mounting bed which is horizontally bored to receive the ends of two tapered locking pins 26, 27. These pins are inserted through suitable openings in the end posts 23, 24 and are substantially at right angles to one another with the terminal end portion of the pin 26 passing over that of the pin 27. The pins are preferably formed with handles 28 to aid a ready withdrawal thereof. For a purpose to be later explained, it is desirable to provide the pins with sleeves of a soft material, soft wire coil sleeves 29 being very satisfactory. A plurality of thin washers can be used instead of a single sleeve.

Figure 6:
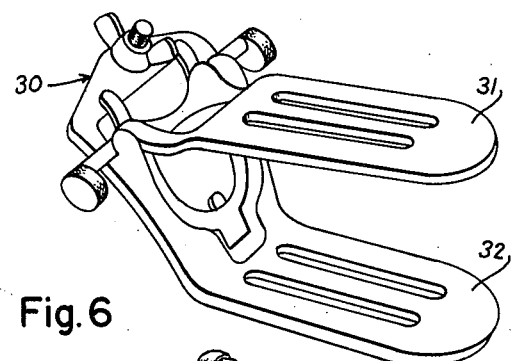
Fig. 6 is a perspective view of an articulator.
Figure 10:
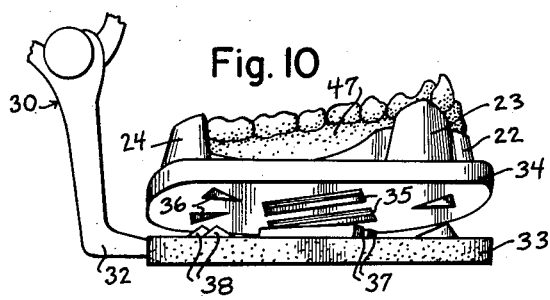
Fig. 10 is a side elevational view illustrating the lower platen freed from its retaining plaster and showing the platen re-positioning lands in the plaster made by the recesses in the under side of the platen.
Figure 11:
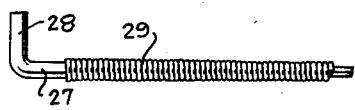
Fig. 11 is a plan view of one of the tapered locking pins equipped with a coil sleeve.

In the practice of dentistry my platens are intended to be employed with a dental articulator, one example being the articulator 30 illustrated in Fig. 6. This particular articulator lends itself to a removable attachment with a platen by embedding one of its arms 31, 32 in plaster 33 in which the base 34 of the platen is set. In this regard it will be noted that the platen base is formed with a pair of central rectangular recesses 35 surrounded by three minor triangular recesses 36. The plaster 33 fills these recesses and not only helps to retain the platen but results in the forming of respective lands 37, 38 when the platen is detached as shown in Fig. 10. These lands make it possible to exactly reposition the platen on the articulator.

Returning to the mounting beds of the platens, a fretwork design which is eminently suitable for my purpose is a recurring pattern in which saltires are set into voids of mascles, the crossed arms of the saltires being designated by 40 and the lozenge-defining legs of the mascles by 41. At the juncture between the fret-work and the side walls 22, the ridge of the concerned fret is desirably sloped so as to provide upswept shoulders 42 occurring at closely spaced intervals along the length of said side walls. It is perforce necessary that each component of the embossing fret-work which is to be put into relief must have its facing side sloped so as to facilitate separation between the mounting bed and the pattern molded thereon. Other than for this, the shape of the fret-work components is unimportant. However, the illustrated mounting bed design has the advantage that the impressions transferred to the molded pattern from the fret-work and from the walls 22 will not be in exact conformity at any two longitudinally spaced points within the length of the bed.

Figure 3:
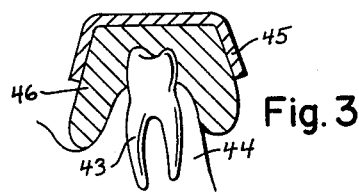
Fig. 3 is a transverse vertical sectional view portraying the manner in which a tray containing hydrocolloid or other like or suitable impression material is employed by a dentist to obtain impressions of a patient's teeth as a step preliminary to his use of the present dental platen.
Figure 2:
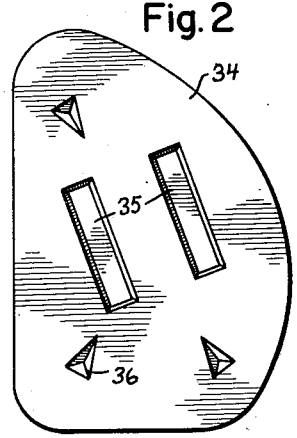
Fig. 2 is a bottom plan view of the embodiment of Fig. 1 to a reduced scale.
Figure 4:
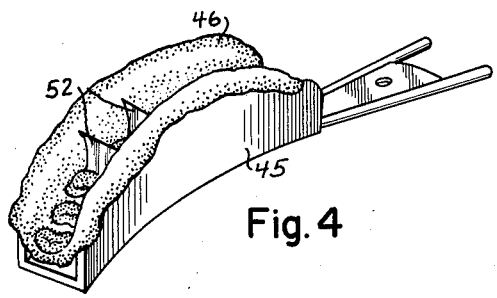
Fig. 4 is a perspective view showing the tray, with its contained body of impression material, after such impression is taken, and with a pair of partition plates in position.
Figure 5:
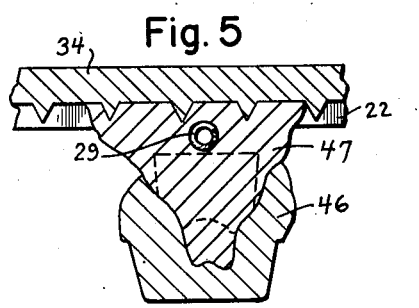
Fig. 5 is a transverse vertical sectional view illustrating the manner in which a body of plaster, while in a plastic state, is applied to the platen of the present invention and given profile shape by pressing the same, after the impressed hydrocolloid material has set, into the mold cavity of the latter.
Figure 7:
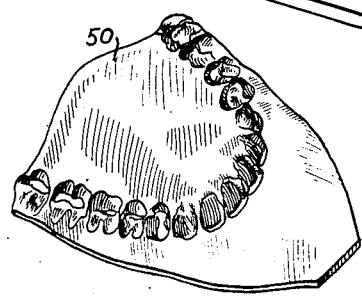
Fig. 7 is a perspective view of a bite pattern.
Figure 8:
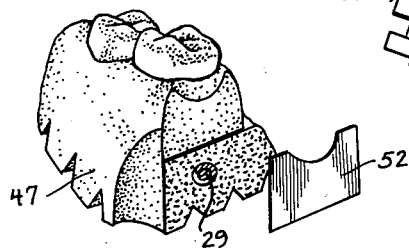
Fig. 8 is a perspective view showing in exploded relationship a portion of the jaw pattern and one of the partition plates.

For purposes of example, let it be assumed that a dentist is called upon to place gold inlays in one or more of the upper and lower teeth contained in the right half of the patient's mouth. The dentist first prepares the concerned teeth by producing the cavities in which the inlays are to be set and then takes impressions of the upper and lower arches including the teeth which are to be restored. The total number of teeth comprehended in the impression should be such as will enable the dentist to later analyze "jaw relation," a term well-known in the field of dentistry and the significance of which, in the present technique, will be clearly understood as the description proceeds. The manner of taking an impression is illustrated in Fig. 3 wherein the tooth and gum from which an impression is taken are designated by 43 and 44, respectively. It is customary, in making an impression, to employ a tray 45 coated with a fairly thick body 46 of soft hydrocolloid or other suitable impression material. Before removal from the mouth the impressed material is caused to set by circulating water around the same. The upper and lower impressions are removed to the laboratory and reverse replicas are cast therefrom, this operation being performed by mixing plaster stone and vibrating the same into the troughs of the impressed hydrocolloid bodies (see Fig. 4). The dentist now takes a pair of platens of a size to meet the particular job, the patens 20, 21 being selected for purposes of illustration, and coincident with the operation of applying wet plaster stone to the impressed trays he also vibrates onto each platen a sufficient quantity of the wet substance to completely cover the fretted portion thereof. The platens serve as mounting bases of the teeth on which restoration work is to be performed. While the plaster applied over the fret-work of the platens and the plaster contained in the impressions of the teeth are still soft, they are brought together—fresh plaster against fresh plaster—and allowed to set as one. During this operation the platen desirably should be face-down toward the related impression so that the weight of the plaster will be upon the impression and thus make the cast replica of the teeth as accurate as possible, this step being shown in Fig. 5. After about a 20- or a 30-second hardening period, the entire assembly is placed for approximately thirty minutes in a bath of potassium sulphate so as to preclude dehydration. Upon removal from the bath the right-half upper and lower jaw plaster replicas, denoted 47 and 48, respectively, are freed both from the platens 20, 21 and from the impression bodies 46, this being easily accomplished by striking rather sharply with a spatula from below, and the plaster replicas are then again fitted upon the fretted faces of the platens, the impression bodies 46 being discarded in that the same are of no further use.

At this point it might be well to note that the locking pins 26, 27 with their coil sleeves 29 are in position when the upper jaw pattern 47 is impressed by the fret-work of the platen 20, so that when the plaster sets the sleeves 29 are embedded in the pattern with the pins extending therethrough. Accordingly, the pins are manually removed when it is desired to free the pattern 47 from its platen 20, and are guided back into locking position by the sleeves 29 when it is desired to lock the upper jaw pattern back in position on the mounting bed of the platen. The sleeves 29 are not required, but they do assure that the pins will not develop a sloppy fit in the plaster of the pattern after being removed and replaced several times.

Figure 9:
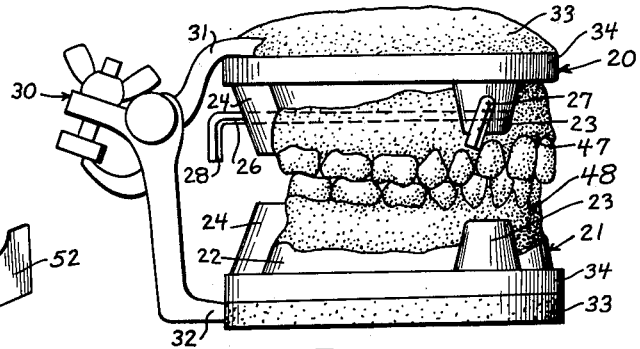
Fig. 9 is a side elevational view portraying plaster patterns of upper and lower right-half jaw segments carried by complementing platens retained by plaster upon the arms of the articulator.

Continuing with the process, the platens 20, 21 with their patterns 47, 48 are secured by plaster to the two arms 31, 32 of the articulator 30 as shown in Fig. 9. In so mounting the platens on the articulator it is necessary that the jaw patterns be given "jaw relation" so that opposing teeth of the castings are in occlusion reproducing the exact relationship which exists in the patient's mouth. In obtaining this exact relationship it is helpful to use a pattern 50 (Fig. 6) of the patient's bite taken in rubber when the dental work was commenced. It will be obvious that if only the upper or lower part of the patterned jaw is being worked upon, the pattern casting of the unworked part can be directly attached to the respective arm of the articulator instead of using a platen therefore.

Assuming for purposes of example that the dentist wishes to first restore the upper teeth, he then frees the casting 47 from the platen 20 after having first removed the locking pins 26, 27. The freed casting is then trimmed and separated into divided sections 51. This dividing step is such as will isolate the portion or portions of the casting which contain the replica of the particular tooth or teeth on which work is to be performed, and it is done by sawing through the casting material and through the soft sleeve 29. It is helpful to place thin separator plates 52, as of metallic foil, within the trough of the impression 46 before the soft plaster is introduced thereto, such being shown in Fig. 4. Castings which contain such separator plates and locking pin sleeves formed of thin washers can be divided without sawing by subjecting the casting to a bending stress. When separator plates are employed, they should be so encased by the plaster as not to come into contact with the fret-work or the confining walls 22 of the platen when the step, portrayed in Fig. 5, of bringing the two bodies of fresh plaster together is performed.

Figure 12:
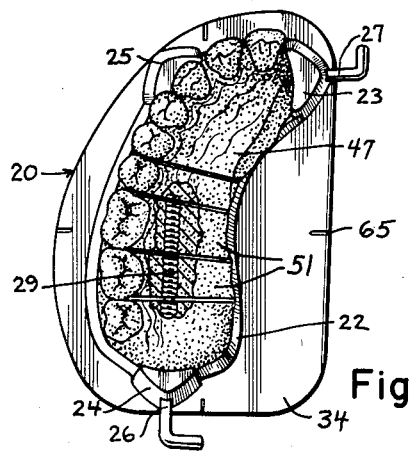
Fig. 12 is a plan view showing the upper right-half jaw pattern locked in place upon the platen and with part of the pattern broken away to show the locking pin sleeve therein.
Figure 14:
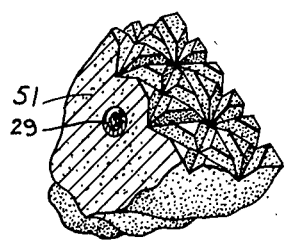
Fig. 14 is an underside perspective view of the pattern of one of the teeth removed from the platen.

With the casting so separated into several divided sections, the latter are replaced in their proper position upon the platen and it will be apparent that each of these replaced sections becomes localized upon the platen in consequence of the fact that its underside is embossed in mating correspondence with the fret-work of the platen as shown in Fig. 14. In the case of the platen 20, these sections of the upper jaw pattern can be locked to the platen by reinserting the tapered pins 26, 27 through the aligned sections of the sleeves 29. The locked pattern sections are illustrated in Fig. 12, and it will be noted that the pin 27 is actually not needed unless the front teeth have been separated from the rest of the casting.

Figure 15:
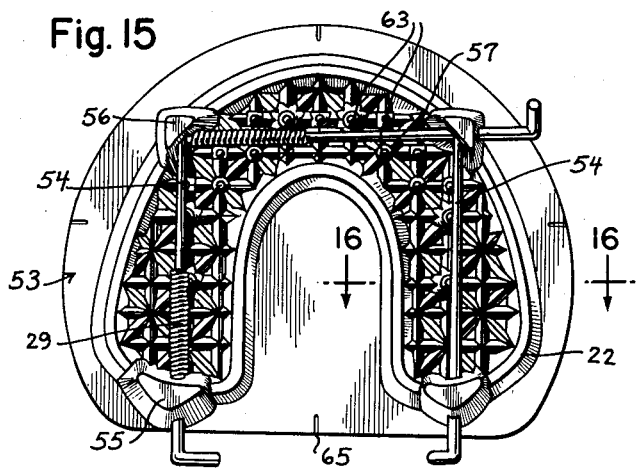
Fig. 15 is a plan view in another form of platen which admits of having the full complement of a patient's upper or lower teeth reproduced thereon, and includes locking pins provided with sleeves, shown fragmentarily.
Figure 16:
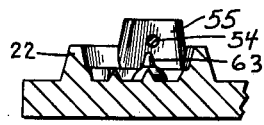
Fig. 16 is a fragmentary vertical sectional view taken on line 16—16 of Fig. 15.
Figure 18:
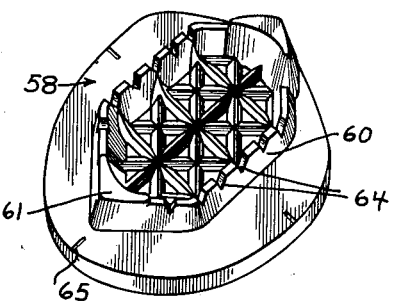
Fig. 18 is a perspective view of still another platen which is provided for patterns of short jaw segments.

Giving, for each tooth which is to be restored, an individual die capable of being removed and replaced at will from and to a master pattern including replicas of other adjacent teeth, and giving the necessary assurance that an exact relationship is maintained at all times between the removable tooth and the other teeth in the pattern, the dentist is enabled to better study the teeth and can perform, in the laboratory, detail work leading to an ultimate restoration of a patient's tooth or teeth with far greater accuracy and with considerable more ease and expedition than has been heretofore possible. Accordingly, a dentist using the present technique is enabled to reduce the chair time of the patient to a minimum and also save an appreciable amount of technical time in the laboratory. The invention has wide usefulness and may, for example, be advantageously employed in cleft-palate cases and for orthodontia work. These last-named operations perforce call for the use of a larger full-arch palate. A dentist also self-evidently selects a full-arch palate in those instances in which he is called upon to perform restoration work upon several teeth of which one or more of the concerned teeth are located at one side and one or more other said teeth are located at the other side of the patient's mouth. Such a full-arch palate, particularly for upper-jaw patterns, is shown in Fig. 15, and it will be readily seen that this palate, denoted 53, is essentially a merger of two right and left-hand palates 20 with the front posts 23 omitted. With this arrangement, a pair of locking pins 54, corresponding to the pin 26, extend forewardly from a pair of end surmounting posts 55 to a pair of anchoring posts 56. A third locking pin 57 passes through one of the anchoring posts 55 into the other. In this manner the entire length of the horse-shoe shaped mounting bed of the palate 53 is serviced by locking pins.

Where only a short segment of a patient's jaw is involved in restoration work, the dentist may prefer to use a shorter mounting bed than that covering half of the arch, and it is for this purpose that the platen 58 of Fig. 18 is provided. The mounting bed is formed with the same fret-work design as before and is surrounded by side walls 60 having surmounting end posts 61 which may be bored to receive a connecting locking pin.

Figure 17:
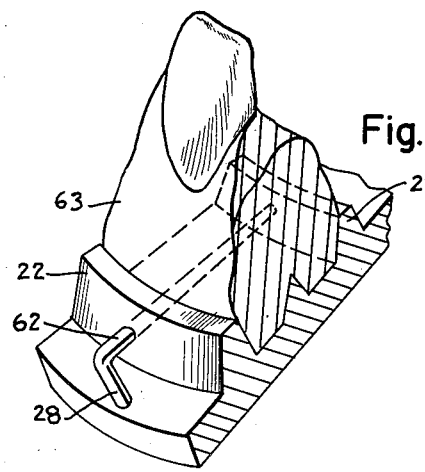
Fig. 17 is a fragmentary perspective view illustrating another manner in which a pattern section can be locked to the platen.

As a substitute for, or an adjunct to the locking pins connecting the surmounting posts as aforedescribed, very satisfactory results are obtained by the use of removable short locking pins 62 (Fig. 17) extending between opposite of the side walls 22 and through a segment 63 of the dental arch replica. A sleeve similar to the sleeves 29 can be provided for the pin 62 if desired. The holes in the side walls for such a pin 62 can easily be drilled by the dentist in the desired location, and this practice is particularly helpful in instances wherein a single upper front tooth is being restored.

My illustration of frets produced in a reoccurring design suggesting saltires (crosses) set into mascles (voided lozenges) is intended to exemplify one of many designs to which the fret-work might be advantageously patterned. The object in view is to localize the sections of the plaster castings by (1) orientating the same, and (2) precluding the sections from rocking. The upswept shoulders 42 and end posts aid materially in the performance of the latter office by resisting rocking of the plaster sections about a transverse axis, and rocking in the lateral direction is precluded by the side walls. To further aid in the stabilization of the sections, I find it advantageous to provide upstanding tapered posts, denoted 63 in both Figs. 1 and 15, and such, when used in conjunction with my illustrated fretwork design, are ideally located at the centers of several of the saltires. I have concentrated the posts 63 at the front of the mounting beds because, if the jaw pattern is subdivided between incisors, the resulting sections are perforce smaller, and hence less stable than if the pattern is divided between molars. It is thought to be obvious that a multiplicity of such tapered posts 63 could be satisfactorily used as a completed replacement of my fretwork and be within the scope of my invention.

In Fig. 18 I have illustrated another way in which the sections of the pattern can be further precluded from rocking about a transverse axis, and namely, by forming lateral notches 64 in the upper face of the side walls. Such notches can also be used for an orientation function. Also, if desired, the notches can be used in conjunction with the tapered posts 63, and with or without my fretwork design.

The palates present a smooth-faced lip extending outwardly beyond the mounting bed proper and this lip is provided upon its facing surface with centering lines 65 placed so as to coincide with both the major and minor axes of the mounting bed. The function of these lines is to permit the impression to be properly located while making the "pour," and which is to say while performing the step shown in Fig. 4 wherein the impression piece 46, with fresh plaster therein, is integrated with the fresh plaster applied to the palate. The dentist employs indelible pencil or the like to mark a median line upon the exposed back of the impression and in the impression piece and the palate together, with the interposed plaster between, the pencil mark is caused to coincide with the centering mark when looking down upon the back face of the impression piece.

Figure 13:
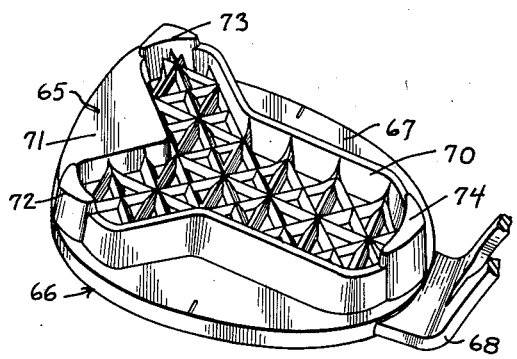
Fig. 13 is a perspective view of a modified platen formed integrally with an articulator.

While I have shown the palates as having the hinged arms of an articulator detachably secured thereto this is by way of illustration only. Where the articulator with which a palate is used has the palate permanently attached thereto, it is desirable to use my modified generally Y-shaped palate 66 which can accommodate casting of either side of the dental arch and is shown in Fig. 13. The base 67 of this palate is permanently connected to an articulator 68 at one end and has its fret-work surrounded by an upstanding wall 70 as before. The portion 71 between the inner walls of the arms of the Y-shaped fret-work may be filled in solidly as shown and the ends of the arms are provided with surmounting posts 72, 73 similar to the post 24. Likewise the major portion of the palate has a post 74 at its outer end. When the palate 66 holds a casting of the right side of the dental arch the casting extends from the post 74 to the post 72 and when it holds a left side casting such perforce extends from the post 74 to the post 73.

The invention admits to minor changes in the details of construction and it is my intention that the hereto annexed claims be given a scope commensurate with the broadest interpretation which the employed language fairly permits.

I claim:

1. A platen serving as a foundation on which to cast an object which is to be divided into sections and characterized in that the mounting bed of said platen is walled along the sides and has elements in relief adorning the bed proper so as to establish a mating interfit with impressed counterparts of said elements produced in the underside of the object cast thereon, thus orientating said impressed underside to the mounting bed that divided sections of the cast object may be removed and replaced at will without disturbing relation, and a removable locking pin extending through the wall along one side of the mounting bed and into the wall along an opposite side thereof.

2. A platen serving as a foundation on which to cast an object which is to be divided into sections and characterized in that the mounting bed of said platen is walled along the sides and has elements in relief adorning the bed proper so as to establish a mating interfit with impressed counterparts of said elements produced in the underside of the object cast thereon, thus orientating said impressed underside to the mounting bed that divided sections of the cast object may be removed and replaced at will without disturbing relation, the underside of the platen being formed with a positioning recess shaped to permit a ready withdrawal of the platen from plaster used to connect the platen to another object.

3. A preformed dental platen serving as a holder and correlator for cast parts of a dental arch on which dental work is to be performed, said platen presenting an embossed mounting bed having protuberances distributed over its areal extent and two spaced upstanding members arranged so that part of the area of the mounting bed lies between them, said protuberances and members being formed as to permit a ready upward withdrawal of a dental arch cast mounted on the platen with its base impressed by the protuberances so that the cast can thereafter be subdivided between teeth and the resulting parts of the cast be easily assembled on the platen in their exact original relationship, said upstanding members being formed with aligned openings at least one of which extends through the respective member so that a locking pin passing through the dental arch cast can be held between and by the members and thereafter removed in an endwise direction.

4. The structure of claim 3 in which the said upstanding members are side walls along edges of the said mounting bed.

5. The structure of claim 3 in which the said mounting bed has side walls and in which the said upstanding members are posts extending higher than the said side walls.

6. The structure of claim 3 in which the said mounting bed is surrounded by side walls and in which the said upstanding members are posts surmounting the said side walls.

7. A preformed dental platen serving as a holder and correlator for cast parts of a dental arch on which dental work is to be performed, said platen presenting an embossed mounting bed having protuberances distributed over its areal extent and three spaced upstanding members arranged so that parts of the area of the mounting bed lie between two of the members and the third member, said protuberances and members being formed as to permit a ready upward withdrawal of a dental arch cast mounted on the platen with its base impressed by the protuberances so that the cast can thereafter be subdivided between teeth and the resulting parts of the cast be easily assembled on the platen in their exact original relationship, said third member being formed with two openings which are aligned with respective openings in the other two members thereby forming two pairs of aligned openings, at least one opening in each said pair extending through the respective member so that two locking pins passing through the dental arch cast can be held between and by the said members and thereafter removed in an endwise direction.

References Cited in the file of this patent

UNITED STATES PATENTS

| | | |
|---|---|---|
| 2,365,475 | Klein | Dec. 19, 1944 |
| 2,619,725 | Roeser | Dec. 2, 1952 |